US005504509A

United States Patent [19]
Kagayama

[11] Patent Number: 5,504,509

[45] Date of Patent: Apr. 2, 1996

[54] IMAGE FORMING APPARATUS WITH SPECIFIC APERTURE ELECTRODE UNIT

[75] Inventor: Shigeru Kagayama, Owariasahi, Japan

[73] Assignee: Brother Kogyo Kabushiki Kaisha, Nagoya, Japan

[21] Appl. No.: 273,908

[22] Filed: Jul. 12, 1994

[30] Foreign Application Priority Data

Nov. 1, 1993 [JP] Japan .................................... 5-273398

[51] Int. Cl.$^{6}$ .................................................... G01D 15/06

[52] U.S. Cl. .............................................. 347/55; 347/123

[58] Field of Search .............................. 347/55, 123, 141, 347/149, 151

[56] References Cited

U.S. PATENT DOCUMENTS

| | | | |
|---|---|---|---|
| 3,689,935 | 9/1972 | Pressman et al. | 347/55 |
| 4,491,855 | 1/1985 | Fujii et al. | 347/55 |
| 4,743,926 | 5/1988 | Schmidlin et al. | 347/55 |
| 4,755,837 | 7/1988 | Schmidlin et al. | 347/55 |
| 4,780,733 | 10/1988 | Schmidlin | 347/55 |
| 4,801,955 | 1/1989 | Miura et al. | 347/55 |
| 4,814,796 | 3/1989 | Schmidlin | 347/55 |
| 4,912,489 | 3/1990 | Schmidlin | 347/55 |
| 5,036,341 | 7/1991 | Larsson | 347/55 |
| 5,038,159 | 8/1991 | Schmidlin et al. | 347/55 |
| 5,095,322 | 3/1992 | Fletcher | 347/55 |
| 5,153,611 | 10/1992 | Kokado et al. | 347/55 |
| 5,170,185 | 12/1992 | Takemura et al. | 347/55 |

*Primary Examiner*—Robert Beatty
*Attorney, Agent, or Firm*—Oliff & Berridge

[57] ABSTRACT

An image forming apparatus including electric field control member for directly controlling the flow of charged particles with an electric field, supply device for supplying the charged particles to the electric field control member, and a counter electrode disposed so as to face the supply device through the electric field control member. The electric field control member includes control electrodes for controlling the electric field and a base member disposed at the counter electrode side of the control electrodes. The control electrode and the base member have apertures and each aperture of the base member, at least at a side away from the apertures in the control electrode, is larger in diameter than the aperture of the control electrodes. The control electrode is pressed against the supply device such that the control electrode is equally bent to either side of a plane passing through the apertures in the control electrode.

22 Claims, 8 Drawing Sheets

IMAGE FORMING APPARATUS WITH SPECIFIC APERTURE ELECTRODE UNIT

BACKGROUND OF THE INVENTION

1. Field of the Invention

The invention relates to an image forming apparatus for use in a copying machine, a printer, a plotter, a facsimile machine, or any apparatus having a printing function.

2. Description of Related Art

There has been hitherto proposed an image forming apparatus in which an image is formed using an aperture electrode unit having plural openings (hereinafter referred to as "apertures"). In this image forming apparatus, a voltage is selectively applied to the aperture electrode unit in accordance with image data to control toner particles to selectively pass through the apertures to form an image on a supporter (image forming medium) with the toner particles which pass through the image apertures of the aperture electrode unit. This type of image forming apparatus is disclosed in the specification of U.S. Pat. No. 3,689,935.

The aperture electrode unit includes an insulating flat plate, a reference electrode which is continuously formed on one side surface of the flat plate, plural control electrodes which are formed on the other surface of the flat plate so as to be electrically insulated from one another, and at least a row of apertures which are provided in correspondence with the respective control electrodes so as to penetrate through the insulating flat plate, the reference electrode and the control electrodes.

The image forming apparatus includes the aperture electrode unit as described above, a voltage supply means for selectively applying a potential across the control electrodes and the reference electrode of the aperture electrode unit on the basis of the image data, a toner supply means for supplying charged toner particles so that the flow of the toner particles passing through the apertures is modulated in accordance with the potential applied to the aperture electrode unit, and a positioning means for positioning the supporter in a particle-flowing path relatively to the aperture electrode unit.

Further, U.S. Pat. Nos. 4,743,926, 4,755,837, 4,780,733 and 4,814,796 disclose an image forming apparatus in which the aperture electrode unit is disposed so that the control electrodes thereof face the supporter side and the reference electrode thereof faces the toner supply side.

On the other hand, U.S. Pat. No. 4,912,489 discloses an image forming apparatus in which the aperture electrode unit is disposed so that the reference electrode thereof faces the supporter side and the control electrodes thereof face the toner supply side. As disclosed in the latter U.S. patent, the image forming apparatus can reduce the voltage to be applied to the control electrodes at an off time to about a quarter of that of the image forming apparatus as disclosed in the former U.S. patents.

Here, the term "off time" means a time when no toner particle is attached onto the supporter, that is, a time when a blank portion of an image is formed. Conversely, the term "on time" means a time when a toner image is formed on the supporter. In the conventional image forming apparatus as described above, the insulating sheet of the aperture electrode unit is formed of an extremely thin insulating member such as a polyimide film having a 25 μm or less thickness. Such an extremely thin film is liable to wrinkle or be scratched, and its contact state with a toner carry member at the toner supply side is not stable because of its low rigidity so that no stable recording operation can be performed.

In order to solve this problem, it may be proposed that the insulating sheet be designed to have a thickness of 50 μm or more with the control electrodes disposed to face the toner carry member at the toner supply side to improve the rigidity of the sheet without deteriorating the controllability of the electric field. However, it has become clear that in some cases print density is lower when a control voltage is applied to this type of aperture electrode unit to perform a printing operation. Through studies and consideration of this phenomenon, it has been proved that the electric field force used to pass the toner through the insulating sheet becomes weaker as the thickness of the insulating sheet increases.

SUMMARY OF THE INVENTION

An object of the invention is to provide an image forming apparatus which can provide sufficient print density but has a simple structure.

In order to attain the above object, an image forming apparatus according to the invention includes an electric field control means for directly controlling flow of charged particles with an electric field, supply means for supplying the charged particles to the electric field control means, and a counter electrode disposed so as to face the supply means through the electric field control means. The electric field control means comprises control electrodes for controlling the electric field and a base member disposed at the counter electrode side of the control electrodes. The control electrode and the base member have apertures therethrough, and each aperture of the base member is larger in diameter than each aperture of the control electrodes. According to the image forming apparatus of this invention thus structured, the base member is provided with the apertures whose diameter is larger than the apertures formed in the control electrodes. With this structure, an electric field for toner flight to the supporter (that is, passing the toner through the aperture electrode unit) is not suppressed by the base member so that the toner passing through the apertures of the control electrodes at the on-time can move under a sufficiently strong electric field.

BRIEF DESCRIPTION OF THE DRAWINGS

A preferred embodiment of the invention will be described in detail with reference to the following figures wherein:

FIG. 9 (*b*) is a graph of the strength of the electric field of the prior art.

DETAILED DESCRIPTION OF THE PREFERRED EMBODIMENTS

Preferred embodiments according to the invention will be described hereunder with reference to the accompanying drawings.

Figure 1:
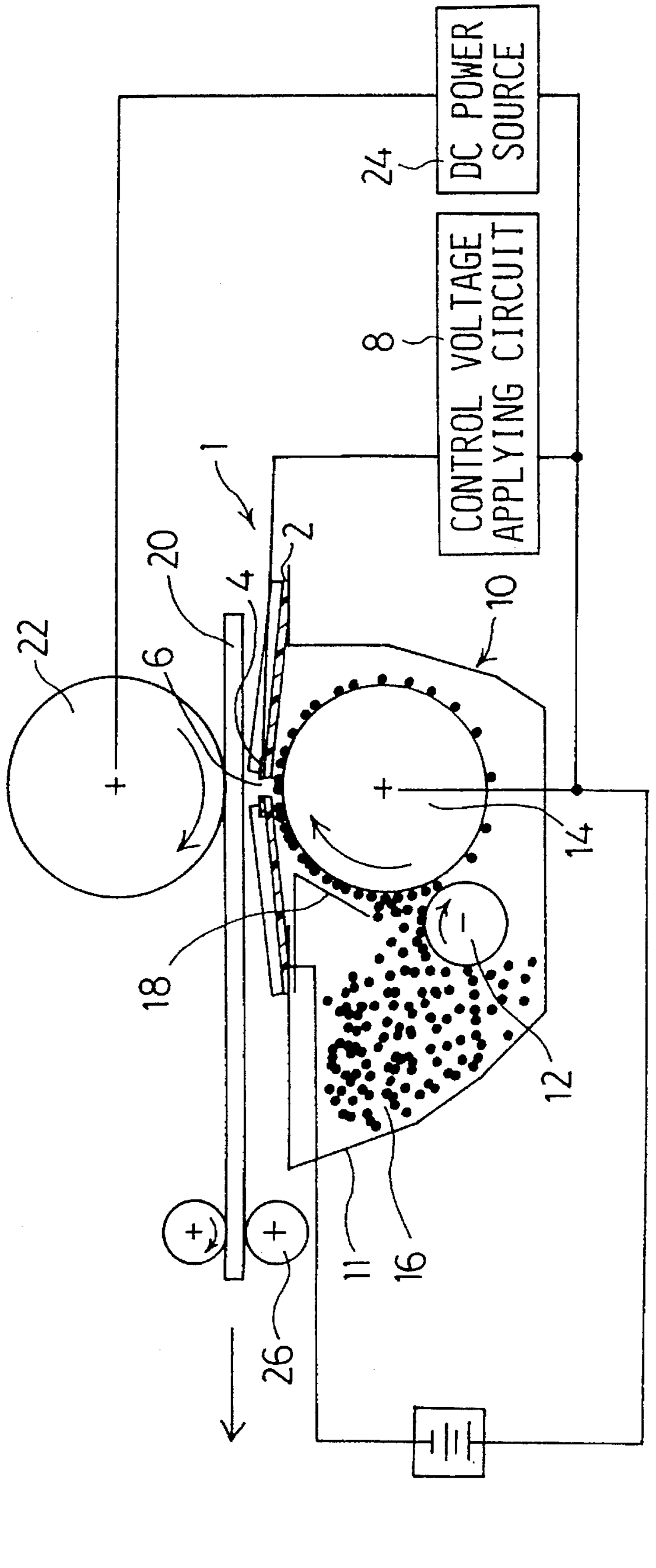
FIG. 1 is a schematic view showing an embodiment of an image forming apparatus of the invention.

FIG. 1 schematically shows an image forming apparatus of the invention. In the image forming apparatus shown in FIG. 1, a cylindrical back electrode roller 22 is rotatably supported by a chassis (not shown) and disposed above an aperture electrode unit 1, serving as toner flow control means, and away from the aperture electrode unit 1 at a one millimeter gap interval. A supporter 20 is fed to be insertable into the gap. Further, a toner supply device 10 is disposed to parallel the longitudinal axis of the aperture electrode unit 1 on a side of the aperture electrode unit 1 opposite to the back electrode roller 22. A fixing device 26 is disposed at a downstream side of a feeding path of the supporter 20 which is fed by the back electrode roller 22.

Next, the elements constituting the image forming apparatus will be described in more detail.

The toner supply device 10 comprises a toner case 11, serving as a housing for the toner supply device 10 and the toner 16 is stored in the toner case 11; a toner supply roller 12; a toner carry roller 14; and a toner-layer restricting blade 18. The toner carry roller 14 serves to carry the toner 16 thereon and feed it toward the aperture electrode unit 1. The toner supply roller 12 supplies the toner 16 to the toner carry roller 14.

The toner supply roller 12 and the toner carry roller 14 are supported to rotate, in directions as indicated by arrows, by the toner case 11, and are disposed in contact with and in parallel to each other. The toner-layer restricting blade 18 is pressed against the toner carry roller 14 and serves to adjust the amount of the toner 16 carried on the toner carry roller 14 so that the toner 16 is uniformly provided on the surface of the toner carry roller 14. It also uniformly charges the toner 16 in addition to the toner supply roller 12.

Figure 2:
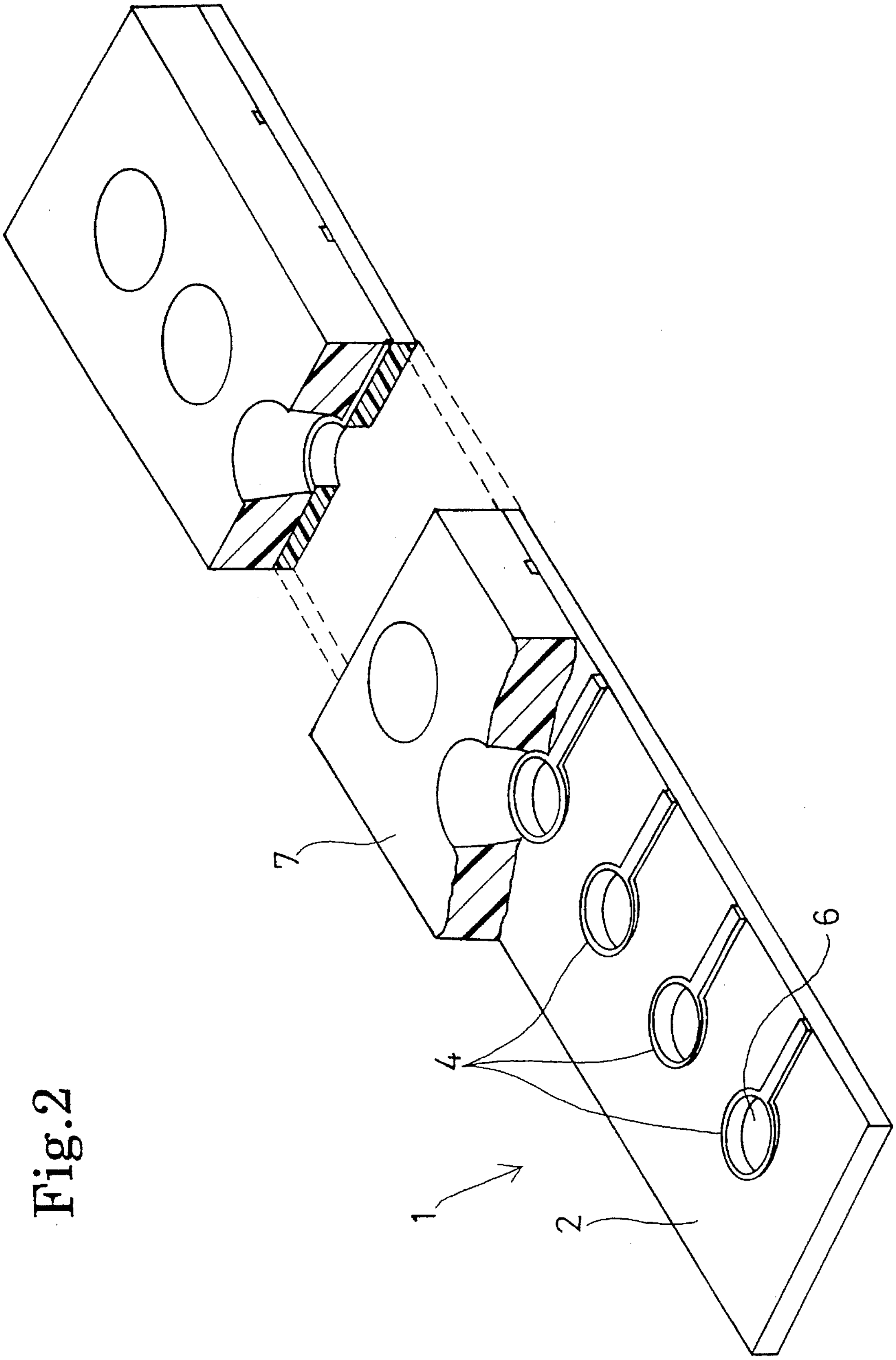
FIG. 2 is a perspective view showing the structure of a first embodiment of an aperture electrode unit used in the image forming apparatus of the embodiment.

Next, the structure of the aperture electrode unit 1, which is a main part of the invention, will be described in more detail with reference to FIGS. 2 and 3. FIG. 2 is a perspective view of the aperture electrode unit and FIG. 3 is a cross-sectional view of a peripheral portion of an aperture of the aperture electrode unit shown in FIG. 2.

Figure 3:
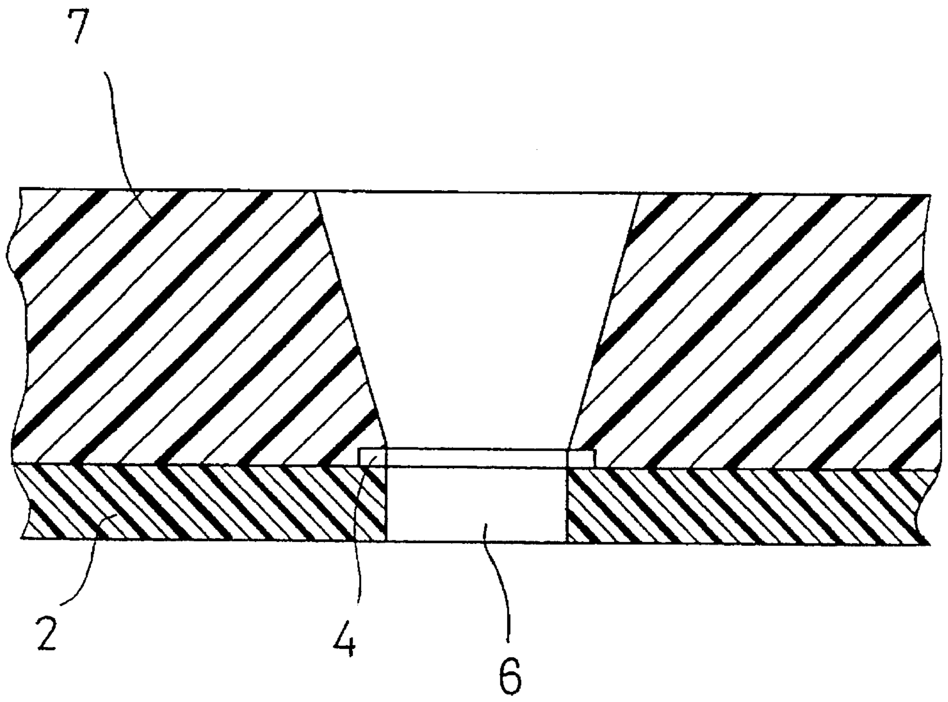
FIG. 3 is a cross-sectional view showing the structure of a peripheral portion of an aperture.
Figure 10:
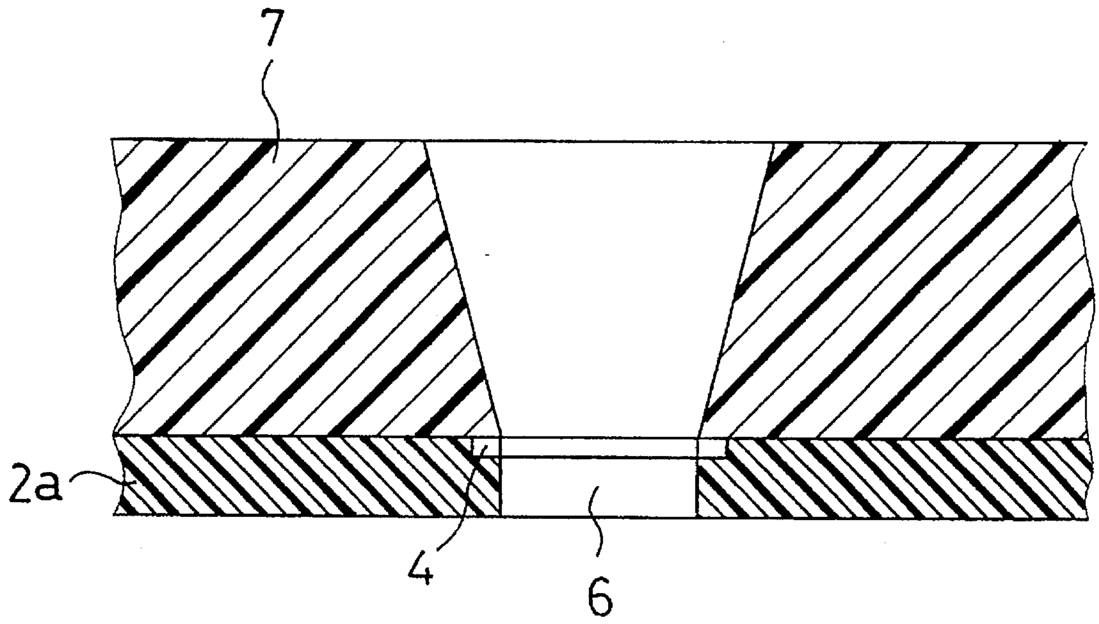
FIG. 10 is a cross-sectional view showing the structure of another embodiment of an aperture electrode unit used in the image forming apparatus of the invention.

As shown in FIGS. 2 and 3, the aperture electrode unit 1 comprises a polyimide insulating base member 7 having a 50 μm thickness in which plural apertures 6 having a 100 μm diameter are formed in a row, control electrodes 4 of 1 μm thickness are disposed adjacent the base member 7 so as to face the apertures of the base member 7. An insulating member 2 of polyimide, or the like, is disposed on the other side of the control electrodes 4 in close contact with the control electrodes 4. The base member 7 is preferably designed to be as thick as possible, for example, a thickness of 50 μm or more. Further, the base member 7 and the insulating member 2 may be adhesively fixed to each other or they may be closely contacted with each other but are detachable from one another. The insulating member 2 serves to prevent the toner carry roller 14 and the control electrodes 4 from being short-circuited to one another. The insulating member 2 may be a thin film, such as a coating or the like, as shown in FIG. 10. In this case, coating layer **2*a* is coated on the surface of the base member 7, after the control electrodes 4 are formed on the base member 7. Accordingly, it is easy to manufacture the aperture electrode unit 1**.

The apertures in at least the base member 7 are designed to have the same or a larger diameter than those of the control electrodes. Further, the apertures in the base member 7 are designed to open in a conical shape. That is, the aperture diameter of the base member 7 is designed to be larger than that of the control electrodes. As shown in FIG. 1, the insulating member 2 of the aperture electrode unit 1 is pressed against the toner carry roller 14 at the position of the apertures while the control electrodes 4 face the supporter 20.

Figure 4:
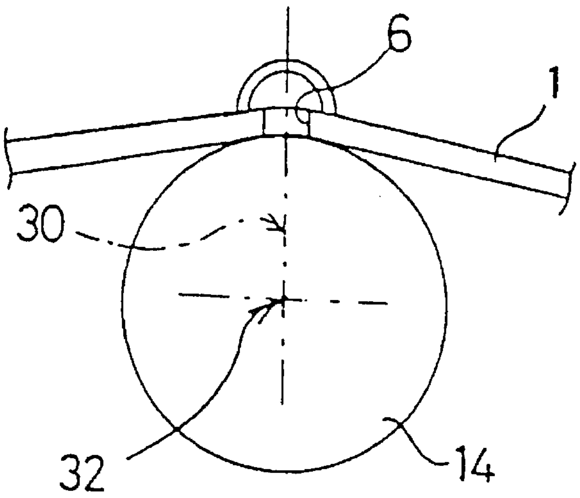
FIG. 4 is a schematic view showing an arrangement of an aperture electrode unit and a toner carry roller used in the image forming apparatus according to the invention.

The positional relationship between the apertures 6 of the aperture electrode unit 1 and the toner carry roller 14 will be described in detail. As shown in FIG. 4, each of the apertures 6 of the aperture electrode unit 1 is so disposed that the center axis 30 of each aperture 6 is positioned over the uppermost portion of the periphery of the toner carry roller 14, at the end of a radius, and the center axis 32 of the toner carry roller 14. Accordingly, each of the apertures 6 is disposed symmetrically right and left of the uppermost portion of the periphery, or the end of the radius, of the toner carry roller 14 so that the toner 16 passing through each aperture is uniformly distributed over the whole area of the aperture 6. Further, since the wall surface of the aperture 6 and the toner flow direction are parallel to each other, the toner 16 can stably flow through the aperture.

In addition, the aperture electrode unit 1 itself is pressed against the toner carry roller 14 such that it can be substantially equiangularly bent at the right and left sides of the apertures 6 around the aperture array as shown in FIG. 4. With this structure, the contact area between the aperture electrode unit 1 and the toner carry roller 14 can be increased. In addition those portions which surround the peripheries at the lower side of the apertures 6 can be pressed uniformly around the entire circumference so that the uniformity in print density can be maintained.

A control voltage applying circuit 8 is connected between the control electrodes 4 and the toner carry roller 14. It serves to selectively apply a voltage of 0V or +50V to the control electrodes 4 on the basis of the image data. Further, a DC power source 24 is connected between the back electrode roller 22 and the toner carry roller 14. The back electrode roller 22 is supplied with a voltage of +1 kV from the DC power source.

The operation of the image forming apparatus thus structured will now be described.

First, the toner carry roller 14 and the toner supply roller 12 start their rotation in the directions indicated by the arrows in FIGS. 1. Through the rotational motion of these rollers, the toner 16 is fed from the toner supply roller 12 and is rubbed against the surface of the toner carry roller 14 to be negatively charged. The toner 16 is then carried on the surface of the toner carry roller 14. The toner 16 thus carried is thinned and further charged by the toner-layer restricting blade 18 and is then fed toward the aperture electrode unit 1 by the rotation of the toner carry roller 14. The toner 16 on the toner carry roller 14 is supplied to the lower side of the apertures 6 while being rubbed against the insulating member 2 of the aperture electrode unit 1.

At this time, those control electrodes 4 corresponding to an image-forming area are supplied with a voltage of +50V in accordance with an input image signal by the control voltage applying circuit 8. Consequently, an electric line of force from the control electrodes 4 toward the toner carry roller 14 is generated in the vicinity of the apertures 6 at the image-forming area due to the potential difference between the control electrodes 4 and the toner carry roller 14. By this electric line of force, the negatively charged toner 16 is electrostatically attracted to a higher potential position so that it is attracted from the surface of the toner carry roller 14 through the apertures 6 toward the control electrodes 4. The toner 16 which has reached the control electrodes 4 side is further electrostatically attracted toward the supporter 20 by the electric field which is formed between the supporter 20 and the aperture electrode unit 1 by the voltage applied to the back electrode 22, and is then deposited to form an image on the supporter 20.

The control electrodes 4 corresponding to a non-image forming area are supplied with a voltage of 0V by the control voltage applying circuit 8. As a result, no electric lines of force are formed between the toner carry roller 14 and the control electrodes 4. Thus, no electrostatic force is applied to the toner 16 on the toner carry roller 14 so that no toner 16 passes through the non-image apertures 6.

The supporter 20 is fed in a direction perpendicular to the aperture array direction by a distance corresponding to one picture element while one array of picture elements are formed on the surface of the supporter 20 with the toner 16. Through the repetitive operation as described above, a toner image is formed on the whole surface of the supporter 20. Then the formed toner image is fixed on the supporter 20 by the fixing device 26.

In this case, the toner layer is kept in an excellent supply state until it is supplied to the apertures 6. That is, the insulating member 2 of the aperture electrode unit 1 has extremely high rigidity because of the provided base member 7. As a result, distortion, such as warp or wrinkle at a heat-mounting time, or instability, such as unwanted vibration or the like at a recording time, is minimized or eliminated. Accordingly, good tension can be supplied to the aperture electrode unit, so that the contact between the aperture electrode unit and the toner layer which will affect recording performance is kept in a stable state and the recording characteristics are thereby improved.

Further, even through the apertures of the base member 7 are formed at the outlet port side of the toner, the electric field for assisting the flight of toner is not weakened because the apertures of the base member 7 are designed to have a larger diameter than those of the control electrodes. Therefore, the toner can be moved onto the supporter 20 by a sufficiently strong electric field when the on/off operations of the toner movement are controlled by the control electric field. As a result, the recording operation can be performed at a high speed and an excellent recording system can be provided.

Figure 9:
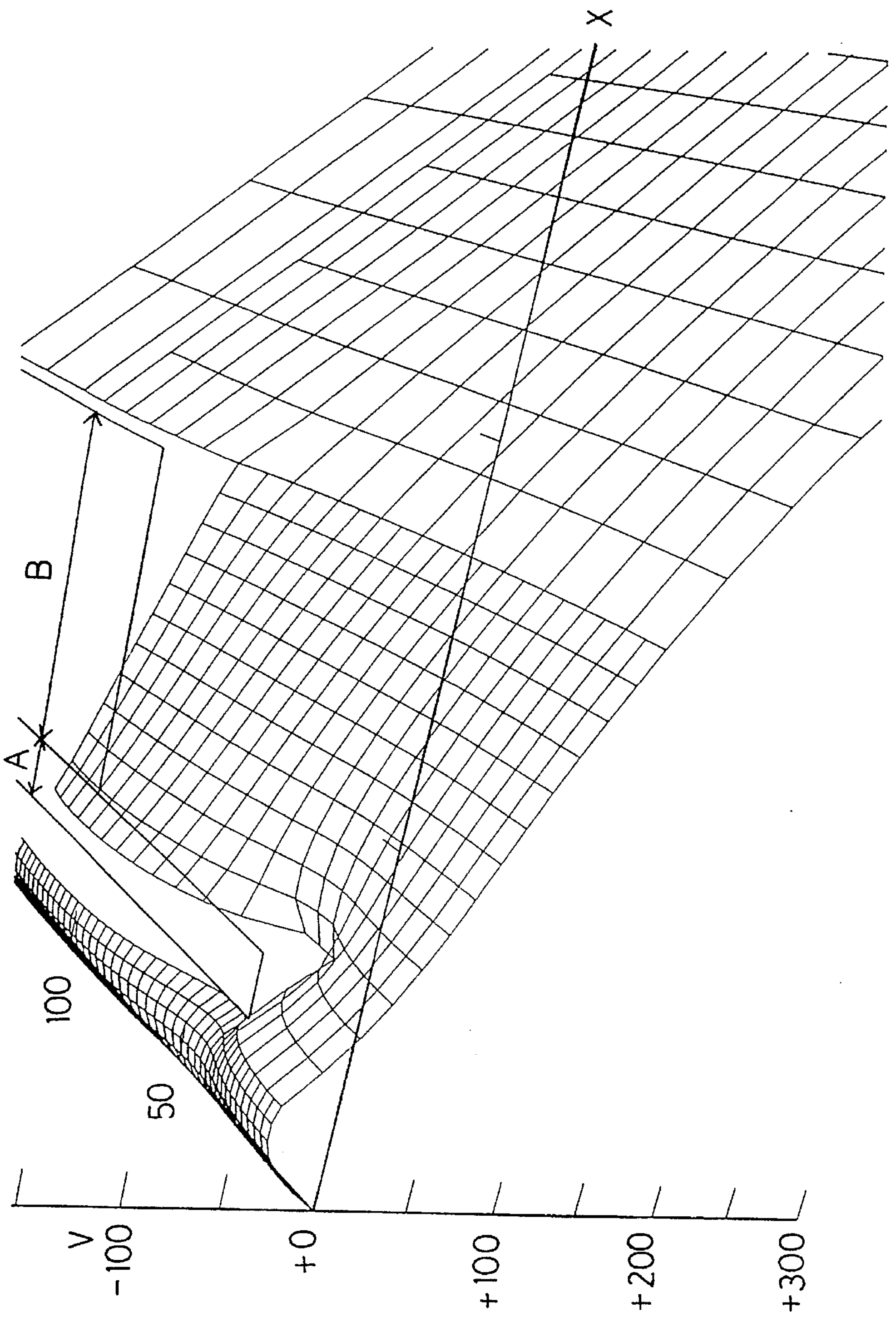
FIG. 9 (*a*) is a graph of the strength of the electric field according to the invention.
Figure 9B:
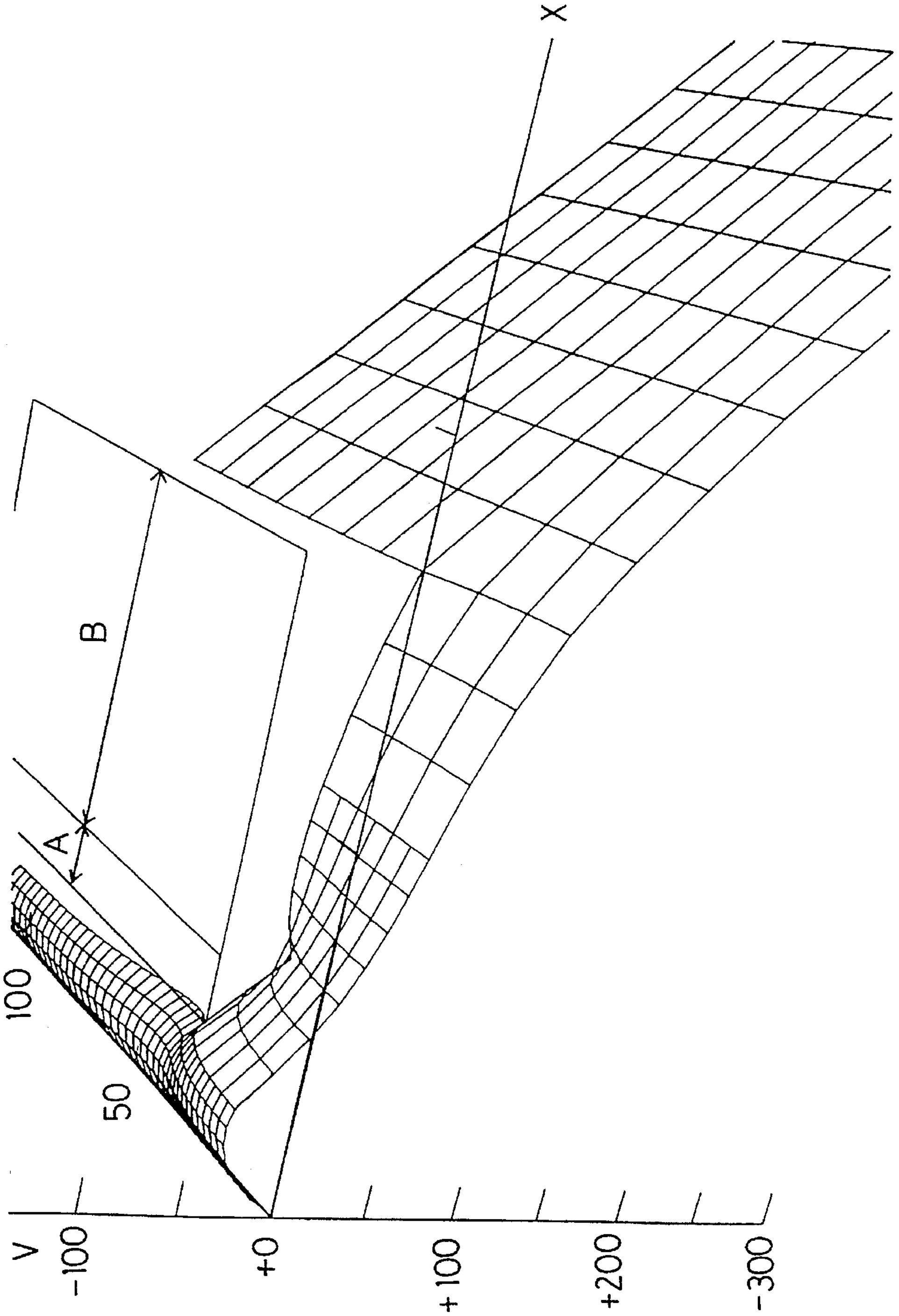
Fig.9(b) PRIOR ART

FIG. 9 (*a*) shows a simulation of an electric field regarding the apparatus of a third embodiment of the invention shown in the FIG. 6 (to be discussed later), in which the aperture 6 portions of the base member 7 are designed in a cylindrical form to have a diameter which is larger than the aperture diameter of the control electrodes 4. The simulation is calculated by the finite element method (FEM). In FIGS. 9(*a*) and 9(*b*), the axis of the ordinate is potential and X coordinate is a distance of the aperture in the direction of toner flow and the slope is the strength of the electrical field. FIG. 9(*b*) shows a simulation of electric field of the apparatus of the prior art in which the aperture diameter in the base member is the same as the aperture diameter of the control electrode. Comparing the two graphs, the electric field of FIG. 9(*a*) resulting from the invention is stronger than the one of FIG. 9(*b*).

If insulating toner is used as the toner 16 in the image forming apparatus as described above, electrical insulation is substantially perfectly maintained between the toner carry roller 14 and the control electrodes 4. Thus, there is no possibility that the apertures 6 would be broken down or damaged by electrical discharge.

In the above process, the control electric field of the control electrodes 4 is formed inside of the control electrodes 4 and the apertures 6 and in the gap between the apertures 6 and the toner carry surface of the toner carry roller 14 which faces the apertures 6. Accordingly, the control electric field can be directly applied to the carried toner 16 and the control efficiency of the toner flow is very high.

Further, even when a part of the supplied toner 16 invades the apertures 6 corresponding to the non-image forming area due to a mechanical force which is applied to the toner 16 through the rubbing between the toner and the aperture electrode unit, the toner 16 can be controlled not to pass through the apertures 6 by the electric field inside of the apertures 6, so that the control of the toner flow is excellently performed.

Still further, since the toner carry roller 14 and the aperture electrode unit 1 confront each other through the toner layer, these elements can be disposed at a relatively short distance. Therefore, the control voltage can be lowered and a low cost driving element can be used.

Since the insulating sheet 2 of the aperture electrode unit 1 is disposed to face the toner carry roller 14, the control electrodes 4 and the toner carry roller 14 are prevented from being electrically short-circuited through their contact even when no toner 16 exists on the toner carry roller 14 due to a failure of the toner supply system. Thus, the driving element is prevented from breaking down.

Further, the aperture electrode unit 1 and the toner 16 on the toner carry roller 14 contact each other at the entrance portions of the apertures 6 and, thus, the toner 16 deposited at the entrance portions of the apertures 6 is pushed out by the toner 16 which is successively supplied by the toner carry roller 14. As a result the apertures 6 are prevented from becoming clogged due to deposition and bridging of the toner 16 at the entrance portions of the apertures 6.

The invention is not limited to the above embodiment, and various modifications may be made without departing from the subject matter of the invention.

For example, in the above embodiment, the control voltage for the non-image forming portion is set to 0V, however, it may be set to a negative voltage. Further, in the above embodiment, the aperture electrode unit 1 is used as the toner flow control means, however, a mesh-shaped electrode unit as disclosed in U.S. Patent No. 5,036,341 may be used as the toner flow control means.

Further, in the above embodiment, the apertures of the base member 7 are designed to be substantially conical in section, however, any design may be made to the apertures of the base member 7 insofar as the aperture diameter at the toner emission side of the base member 7 is larger than the aperture diameter of the control electrodes 4. Other embodiments of the apertures of the base member 7 to satisfy the above requirement are shown in FIGS. 5 to 8. In FIGS. 5 to 8, elements having the same functions are represented by the same reference numerals.

Figure 5:
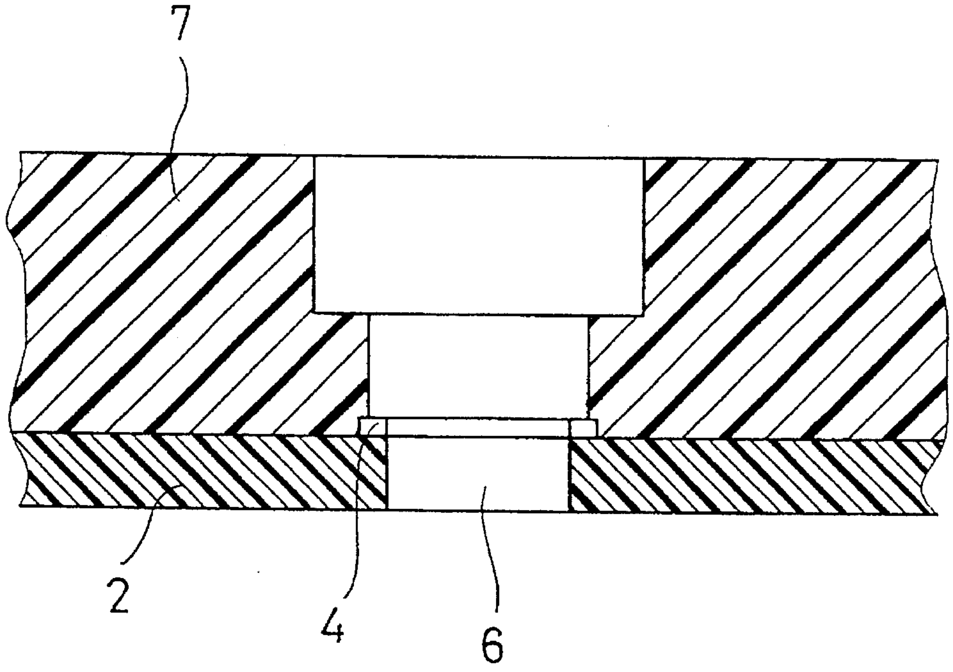
FIG. 5 is a cross-sectional view showing the structure of a peripheral portion of an aperture in a second embodiment of the aperture electrode unit of the invention.

In a second embodiment shown in FIG. 5, an aperture portion of the base member 7 is designed in a step form (in a two-step structure) to have a larger aperture diameter at the toner emission side.

Figure 6:
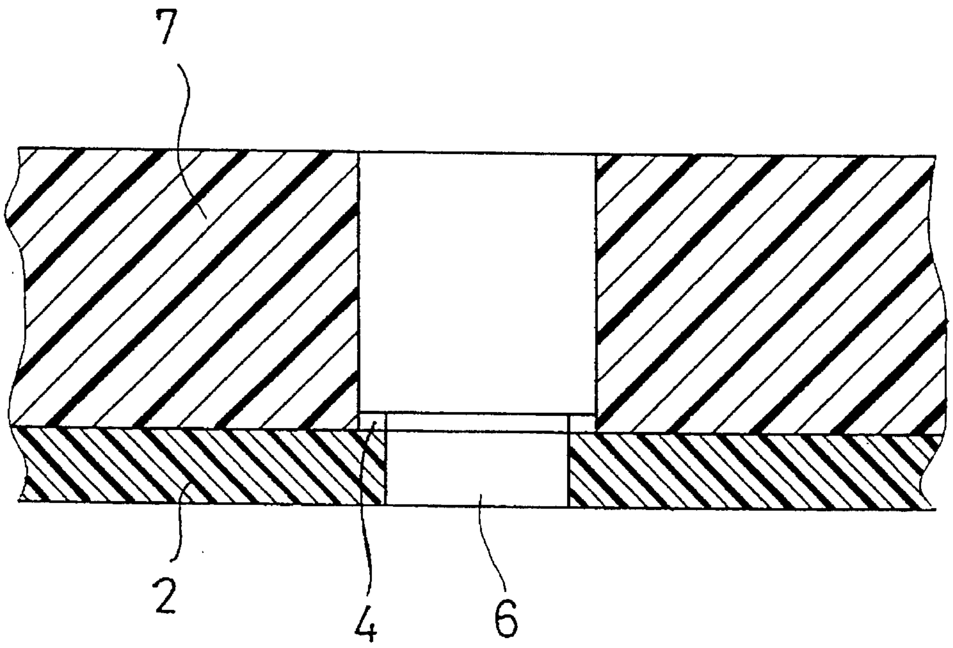
FIG. 6 is a cross-sectional view showing the structure of a peripheral portion of an aperture in a third embodiment of aperture electrode unit of the invention.

In a third embodiment shown in FIG. 6, an aperture portion of the base member 7 is designed in a cylindrical form to have a diameter which is larger than the aperture diameter of the control electrode 4 and substantially equal to the diameter of a conductive wire portion of the control electrode 4.

Figure 7:
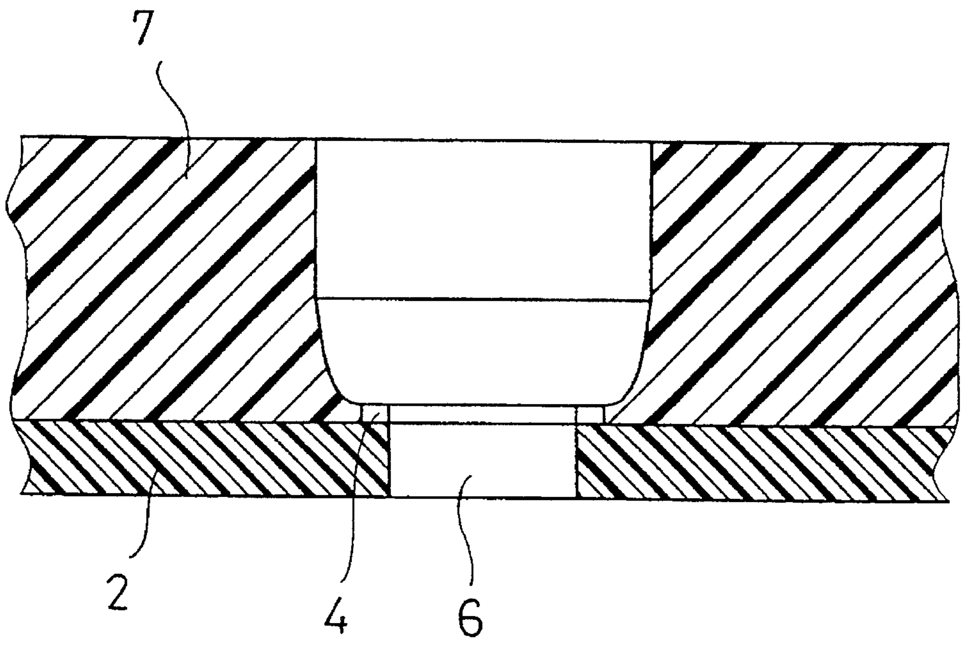
FIG. 7 is a cross-sectional view showing the structure of a peripheral portion of an aperture in a fourth embodiment of the aperture electrode unit of the invention.

In a fourth embodiment shown in FIG. 7, an aperture portion of the base member 7 is designed in a two-step structure in which a first step portion nearer to the control electrode 4 is rounded at the bottom portion thereof to be formed in a ball shape and a second step portion is designed in a cylindrical form.

Figure 8:
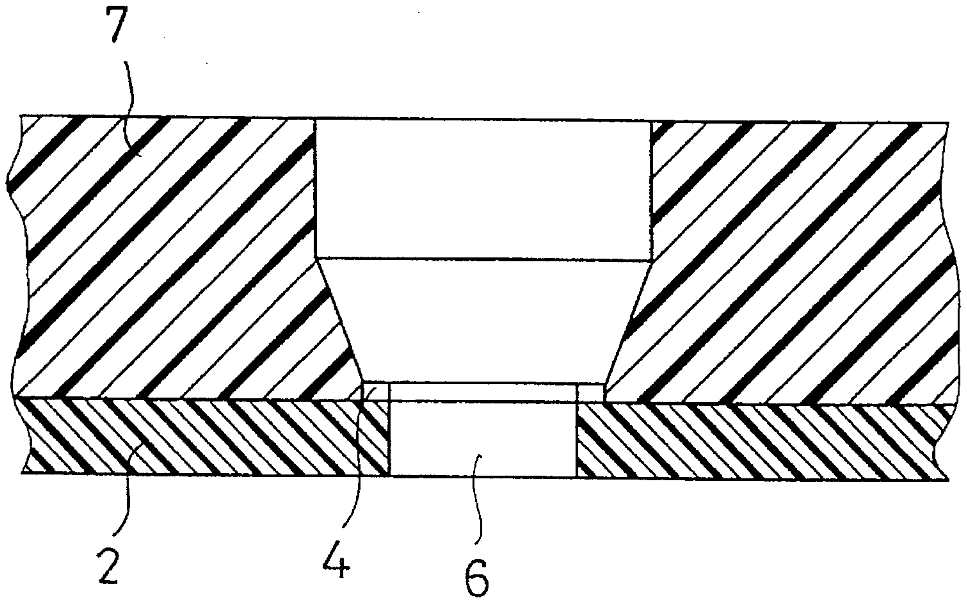
FIG. 8 is a cross-sectional view showing the structure of a peripheral portion of an aperture in a fifth embodiment of the aperture electrode unit of the invention.

In a fifth embodiment shown in FIG. 8, an aperture portion of the base member is also designed in a two-step structure, however, a first step portion nearer to the control electrode 4 is designed in a conical form. In all the embodiments, the electric field for the toner flight is not weakened and it is formed to extend to portions in the vicinity of the control electrodes 4 so that the toner which is on-off modulated by the control electric field can move smoothly without being trapped.

As is apparent from the foregoing, according to the image forming apparatus of the invention, the electric field control means includes control electrodes for controlling the electric field and a base member disposed at the counter electrode side of the control electrodes. The control electrodes and the base member are provided with apertures. The aperture's diameter of the base member is designed to be larger than the aperture's diameter of the control electrodes. Thus, the electric field for toner movement is not weakened by the base member. Therefore, the toner passing through the apertures at the on-time can move toward the supporter in a sufficiently strong electric field so that sufficient print density is obtained and a high speed print operation results.

What is claimed is:

1. An image forming apparatus, comprising:

a toner supply that supports and supplies charged toner particles;

an aperture electrode unit having a base member having apertures therein and control electrodes formed around said apertures, wherein the aperture diameter of said base member in a side confronting said control electrodes is smaller than the aperture diameter of said base member in a side away from said control electrodes; and a back electrode confronting said aperture electrode unit and attracting charged toner particles, wherein said toner supply comprises a toner carrier roller directly contacting said aperture electrode unit, said aperture electrode unit is pressed against said toner carrier roller such that said aperture electrode unit is substantially equally angularly bent to either side of a plane defined by a radius of said toner carrier roller passing through a diameter of the openings of said aperture electrode unit.

2. An image forming apparatus as claimed in claim 1, wherein said apertures in said base member open in a conical shape.

3. An image forming apparatus as claimed in claim 1, wherein said aperture electrode unit includes an insulating member insulating said control electrodes, said insulating member disposed on a side of said control electrodes opposite said base member.

4. An image forming apparatus as claimed in claim 1, wherein said toner supply comprises a toner particle casing that stores toner particles, a toner carrier member associated with said toner particle casing that receives toner particles from said toner particle casing and transports the toner particles to said aperture electrode and a toner trimming blade disposed adjacent to said toner carrier member that adjusts a layer of toner particles carried by said toner carrier member.

5. An image forming apparatus as claimed in claim 1, further comprising a voltage supply coupled to said control electrodes to selectively supply a voltage to said control electrodes and a power supply coupled to said back electrode to supply a voltage to said back electrode.

6. An image forming apparatus as claimed in claim 1, wherein said apertures in said base member has a two-step structure.

7. An image forming apparatus as claimed in claim 1, wherein said apertures in the base member has a cylindrical form that has a diameter which is larger than the aperture diameter of the control electrodes and substantially equal to the diameter of a conductive wire portion of the control electrodes.

8. An image forming apparatus as claimed in claim 1, wherein said apertures in the base member has a two-step structure in which a first step portion nearer to the control electrode is rounded at the bottom portion thereof to be formed in a ball shape and a second step portion is designed in a cylindrical form.

9. An image forming apparatus as claimed in claim 1, wherein said apertures in the base member has a two-step structure in which a first step portion nearer to the control electrode has a conical form.

10. An image forming apparatus, comprising:

toner supplying means for supplying charged toner particles;

toner flow control means having openings therein with control electrodes formed around said openings, said toner flow control means for controlling a flow of the charged toner particles supplied by said toner supplying means through said openings using an electric field, wherein an opening diameter of each opening of said toner flow control means in a side facing to said toner supplying means is smaller than an opening diameter of each opening of said toner flow control means in a side away from said toner supplying means; and back electrode means for attracting charged toner particles that have passed through said openings and said back electrode means confronting said toner flow control means, wherein said back electrode means is disposed on a side of said toner flow control means opposite to said toner supplying means, wherein said toner supplying means comprises a toner carry roller directly contacting said toner flow control means, said toner flow control means is pressed against said toner carry roller such that said toner flow control means is substantially equiangularly bent to either side of a plane defined by a radius of said toner carry roller passing through a diameter of the openings of said toner flow control means.

11. An image forming apparatus as claimed in claim 10, wherein said toner flow control means further comprises a base member having openings therein and disposed on said control electrode means, wherein a diameter of the openings of said base member in a side confronting said control electrode member is smaller than a diameter of the openings of said base member in a side opposite to said control electrode.

12. An image forming apparatus as claimed in claim 11, wherein said apertures in the base member open in a conical shape.

13. An image forming apparatus as claimed in claim 11, wherein said toner flow control means includes an insulating member insulating said control electrodes and said insulating member is disposed at a side of said control electrodes opposite to said base member.

14. An image forming apparatus as claimed in claim 11, wherein said toner particles are insulating toner particles.

15. An image forming apparatus as claimed in claim 11, further comprising a voltage supply coupled to said control electrode means to selectively supply a voltage to said control electrode means and a power supply coupled to said back electrode means to supply a voltage to said back electrode means.

16. An image forming apparatus, comprising:

a toner supply that supports and supplies charged toner particles;

an aperture electrode unit having a base member having apertures therein, control electrodes formed around the apertures on the base member and a coating layer coating the control electrodes so as to insulate the control electrodes, wherein the aperture diameters of said base member in a side confronting to said control electrodes is smaller than the aperture diameters of said base member in a side opposite to said control electrodes; and a back electrode confronting said aperture electrode unit and attracting charged toner particles, wherein said toner supply comprises a toner carry roller directly contacting said aperture electrode unit, said aperture electrode unit is pressed against said toner carry roller such that it is substantially equiangularly bent to either side of a plane defined by a radius of said toner carry roller passing through a diameter of the apertures of said aperture electrode unit.

17. An image forming apparatus as claimed in claim 16, further comprising a voltage supply coupled to said control electrode to selectively supply a voltage to said control electrode and a power supply coupled to said back electrode to supply a voltage to said back electrode.

18. An image forming apparatus as claimed in claim 17, wherein said apertures in the base member open in a conical shape.

19. An image forming apparatus as claimed in claim 17, wherein said apertures in the base member have a two-step structure.

20. An image forming apparatus as claimed in claim 17, wherein said apertures in the base member have a cylindrical form with a diameter which is larger than the aperture diameter of the control electrodes and is substantially equal to the diameter of a conductive wire portion of the control electrodes.

21. An image forming apparatus as claimed in claim 17, wherein said apertures in the base member have a two-step structure in which a first step portion nearer to the control electrode is rounded at the bottom portion thereof to be formed in a ball shape and a second step portion has a cylindrical form.

22. An image forming apparatus as claimed in claim 17, wherein said apertures in the base member have a two-step structure in which a first step portion nearer to the control electrode is designed to be in a conical form.

* * * * *